United States Patent [19]

Erche et al.

[11] 4,205,368

[45] May 27, 1980

[54] METHOD FOR THE TRANSMISSION OF DC CURRENT BETWEEN AT LEAST ONE RECTIFIER STATION AND SEVERAL INVERTER STATIONS

[75] Inventors: Manfred Erche, Erlangen-Buckenhof; Ludwig Filberich, Erlangen; Dusan Pove, Nuremberg; Hermann Waldmann; Manfred Weibelzahl, both of Weiher, near Erlangen, all of Fed. Rep. of Germany

[73] Assignee: Siemens Aktiengesellschaft, Munich, Fed. Rep. of Germany

[21] Appl. No.: 853,883

[22] Filed: Nov. 22, 1977

Related U.S. Application Data

[63] Continuation of Ser. No. 677,962, Apr. 19, 1976, abandoned.

[30] Foreign Application Priority Data

Apr. 28, 1975 [DE] Fed. Rep. of Germany ....... 2518910

[51] Int. Cl.$^2$ ............................................. H02M 5/40
[52] U.S. Cl. ..................................................... 363/35
[58] Field of Search ................ 363/35, 51, 96; 307/82

[56] References Cited

U.S. PATENT DOCUMENTS

| 3,447,063 | 5/1969 | Hammarlund | 363/35 |
| 3,470,442 | 9/1969 | Ainsworth | 363/35 |
| 3,500,057 | 3/1970 | Stackegard | 307/82 |
| 3,526,780 | 9/1970 | Uhlmann et al. | 307/82 |
| 4,019,115 | 4/1975 | Lips | 363/35 XR |

Primary Examiner—William M. Shoop
Attorney, Agent, or Firm—Kenyon & Kenyon

[57] ABSTRACT

A method for the transmission of DC current via a DC network between at least one rectifier station and several inverter stations wherein reference inputs are formed on the basis of a fixed predetermined current-voltage characteristic and a fixed predetermined voltage-current characteristic matched to the aforesaid current-voltage characteristic for the voltage controller of the rectifier of the rectifier station and for the current controller of each inverter station, respectively. The formed reference input for each current controller is released to that current controller when the maximum value of the formed reference input exceeds a value determined for the reference input corresponding to the power demand associated with the inverter station which includes that current controller. When the maximum value of the formed reference input is less than the latter determined value, such value is released as the reference input to the current controller.

3 Claims, 3 Drawing Figures

METHOD FOR THE TRANSMISSION OF DC CURRENT BETWEEN AT LEAST ONE RECTIFIER STATION AND SEVERAL INVERTER STATIONS

This is a continuation, of application Ser. No. 677,962, filed Apr. 19, 1976 now abandoned.

BACKGROUND OF THE INVENTION

1. Field of the Invention

The invention relates to a method for controlling the transmission of DC current between at least one rectifier station and several inverter stations and, in particular, a method in which the reference inputs for the controllers of the rectifier and the inverter stations are formed as a function of the current and the voltage in the DC network.

2. Description of the Prior Art

Such a method is disclosed in German Offenlegungsschrift No. 1,588,750. In the disclosed method, a reference input is formed as a function of the voltage in the DC network, and the control of the individual inverter stations takes place in accordance with their natural characteristics. With such a control of the individual stations, there is mutual interaction between them. Thus, for example, when the power consumption is increased in one inverter station the other inverter stations must reduce their power consumption accordingly, if the rectifier stations have reached their power limit. As a result, when using this control method, a given amount of power cannot be reliably made available to an individual or several inverter stations. The latter shortcoming of the aforesaid prior art method can be overcome by providing a centrally arranged balancing device for the reference input, but such an arrangement requires the employment of a highly complex transmission means for transmitting the corresponding measurement values of the individual rectifier-inverter stations to the balancing device.

It is, therefore, an object of the present invention to provide a method for transmitting DC current between at least one rectifier and several inverter stations in which power consumption of the individual inverter stations can be controlled up to a given, predetermined value without the need of a central balancing device and without mutual interaction.

SUMMARY OF THE INVENTION

In accordance with the principles of the present invention, the above and other objectives are accomplished in a method in which the rectifier at the rectifier station is voltage-controlled and the inverters at the inverter stations are current-controlled. More particularly, a reference input for the voltage controller of the rectifier is formed by means of a computer circuit on the basis of a fixed, predetermined current-voltage characteristic as a function of the respective, maximum possible current in the rectifier station. In turn, a maximum value is formed for the reference input of the current controller of each respective inverter by means of a computer circuit on the basis of a fixed, predetermined voltage-current characteristic matched to the current-voltage characteristic and the output capacity of the rectifier station, as a function of the voltage in the DC network. The maximum value for the reference input of each inverter, in turn, is compared with a value for the reference input corresponding to the power demand of the respective inverter station in a minimum selection stage which releases the respective smaller value for the corresponding current controller. When employing the above-described method of the invention it is, thus, possible to guarantee that each inverter station receives a predetermined power which depends on the respective output capacity of the rectifier station.

In the particular embodiment of the invention to be disclosed, the accuracy of the control achieved is further improved by computing the reference inputs in the rectifier station and in each inverter station in such a manner as to account for the voltage drop along the line between the station in question and a common, fictitious point in the network. Additionally, if the guaranteed power is not fully needed by an inverter station, then the unrequired power can be released or made available to another inverter station by forming in each inverter station the difference between the maximum value of its reference input and a quantity proportional to the current in the station and by adding the resultant difference value, if it is positive, to the maximum value of the reference input of each of the other inverter stations.

DESCRIPTION OF THE DRAWINGS

The above and other features and aspects of the present invention will become apparent upon reading the following detailed description in conjunction with the accompanying drawings, in which.

DETAILED DESCRIPTION

Figure 1:
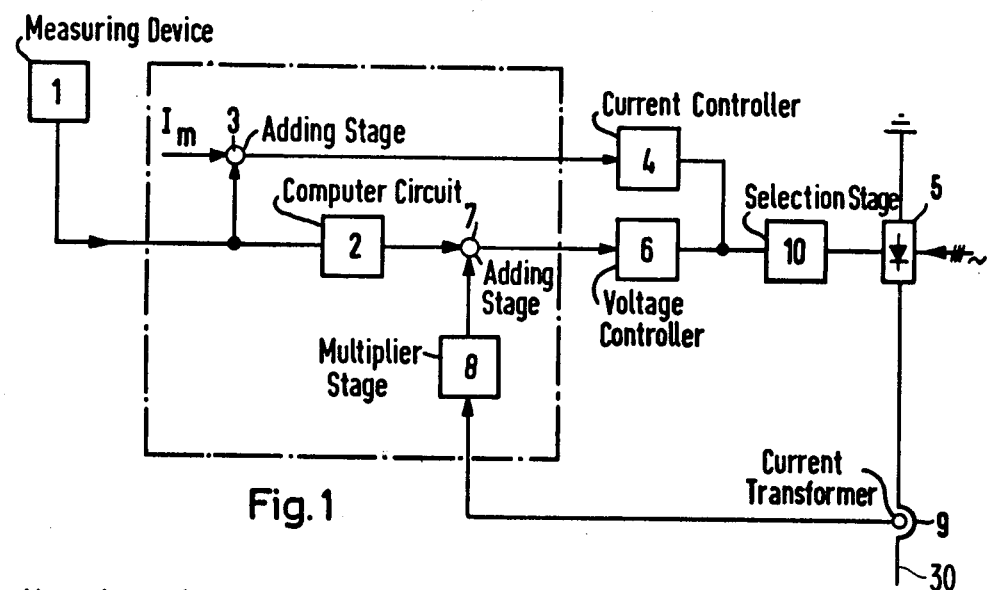
FIG. 1 shows a block diagram for determining the reference input in a rectifier station in accordance with the method of the invention.

In FIG. 1, a measuring device 1 delivers at its output a signal proportional to the power available in a power station. This output signal is fed to a computer circuit 2 and a first adding stage 3. In the adding stage 3, a marginal-current value $I_m$ is added to the output current value corresponding to the output signal being supplied by the measuring device, and the total is fed as a reference input to a current controller 4 controlling the rectifier 5 of a rectifier station.

In the computer circuit 2, a reference input for the voltage controller 6 of the rectifier 5 is determined on the basis of a fixed, predetermined current-voltage characteristic as a function of the current value corresponding to the output signal being furnished by the measuring device 1. A second adding stage 7 is arranged between the output of the computer circuit 2 and the input of the voltage controller 6. In this second adding stage, a value corresponding to the voltage drop between the rectifier station and a fictitious point in the DC network connecting the rectifier station and a plurality of inverter stations is added to the value for the reference input furnished by the computer circuit.

More particularly, the value of the aforesaid voltage drop is determined by means of a first multiplier stage 8. The latter stage is fed by a current transformer 9 in the output line 30 of the rectifier 5 with a quantity proportional to the current flowing in the rectifier 5. This value is multiplied in the multiplier stage by a quantity which corresponds to the line resistance between the rectifier station and a fictitious point in the network.

Thus, a quantity corresponding to the voltage drop between the rectifier station and the fictitious point in the network appears at the output of the first multiplier stage 8. The total of the reference input for the voltage controller 6 formed by the second adding stage is therefore referenced to the voltage at the fictitious point in the network.

The outputs of the current controller 4 and the voltage controller 6 are selectively fed to the rectifier 5 via a selection stage 10. In particular, the latter selection stage releases to the rectifier 5 the reference input which has the smaller value.

Figure 2:
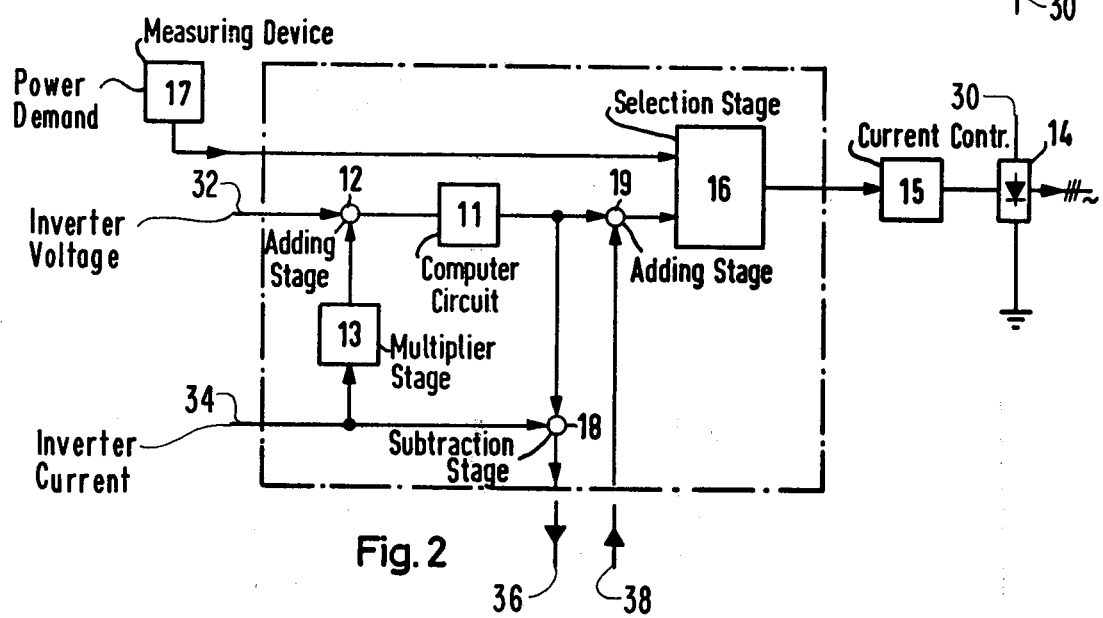
FIG. 2 shows a block diagram for determining the reference input in an inverter station in accordance with the method of the invention.

FIG. 2 shows a further computer circuit 11 for forming a reference input for a current controller 15. The latter controller controls the rectifier 14 of one inverter station which is connected by the above-mentioned DC network, i.e., over line 30 to the rectifier station. The computer circuit 11 is fed a measured-voltage value from a third adding stage 12 which sums a quantity corresponding to the voltage in the inverter station on line 32 and a quantity corresponding to the voltage drop between the inverter station and the fictitious point in the network connecting it to the rectifier station.

The voltage of the inverter station is measured by a voltage transformer (not shown) in the inverter station. The value of the voltage drop, in turn, is determined by means of a second multiplier stage 13. In this second multiplier stage, a quantity corresponding to the current in the inverter station present on line 34 is multiplied by the quantity corresponding to the line resistance between the inverter station and the fictitious point in the network. The current in the inverter station is measured by means of a current transformer, which also is not specifically shown in the drawing.

The computer circuit 11 forms a maximum value for the reference input of the current controller 15 on the basis of a fixed, predetermined voltage-current characteristic as a function of the measured voltage value being supplied by the adder 12. The aforesaid maximum reference input is selectively fed to the controller 15 via a minimum-selection stage 16, one of whose inputs is connected to the output of the computer 11 and whose output is connected to the controller 15. The other input of the selection stage 15 is fed by a further measuring device 17 with a predetermined value which corresponds to the respective power demand of the inverter station. The minimum-selection stage 16 releases the respective smaller value as the reference input for the current controller 15.

Also included in the apparatus of FIG. 2 is further subtraction stage 18 which is fed the maximum reference value formed by the computer circuit 11 and value proportional to the current in the rectifier 14. The difference between the aforesaid two values present at the output of the subtraction stage 18 represents the portion of the power guaranteed by the fixed, predetermined characteristic which is not presently needed by the inverter and, thus, able to be distributed to other inverters. In particular, the difference value on line 36 formed by the subtraction stage 18 can be transmitted to other inverter stations and added to the maximum value for the reference input determined by the computer circuits at these stations.

In FIG. 2 a fourth adding stage 19, connected between the computer circuit 11 and the minimum-selection stage 16, is provided to receive on line 38 the difference value formed by the subtraction stage 18 of another inverter station. The adding stage 19 adds the difference value to the maximum value formed by the computer circuit 11. In this manner, if the guaranteed power for one inverter station is not fully used, the unused power is made available to another inverter station or stations. This has the further advantage that the available power output of a station can always be utilized fully.

Figure 3:
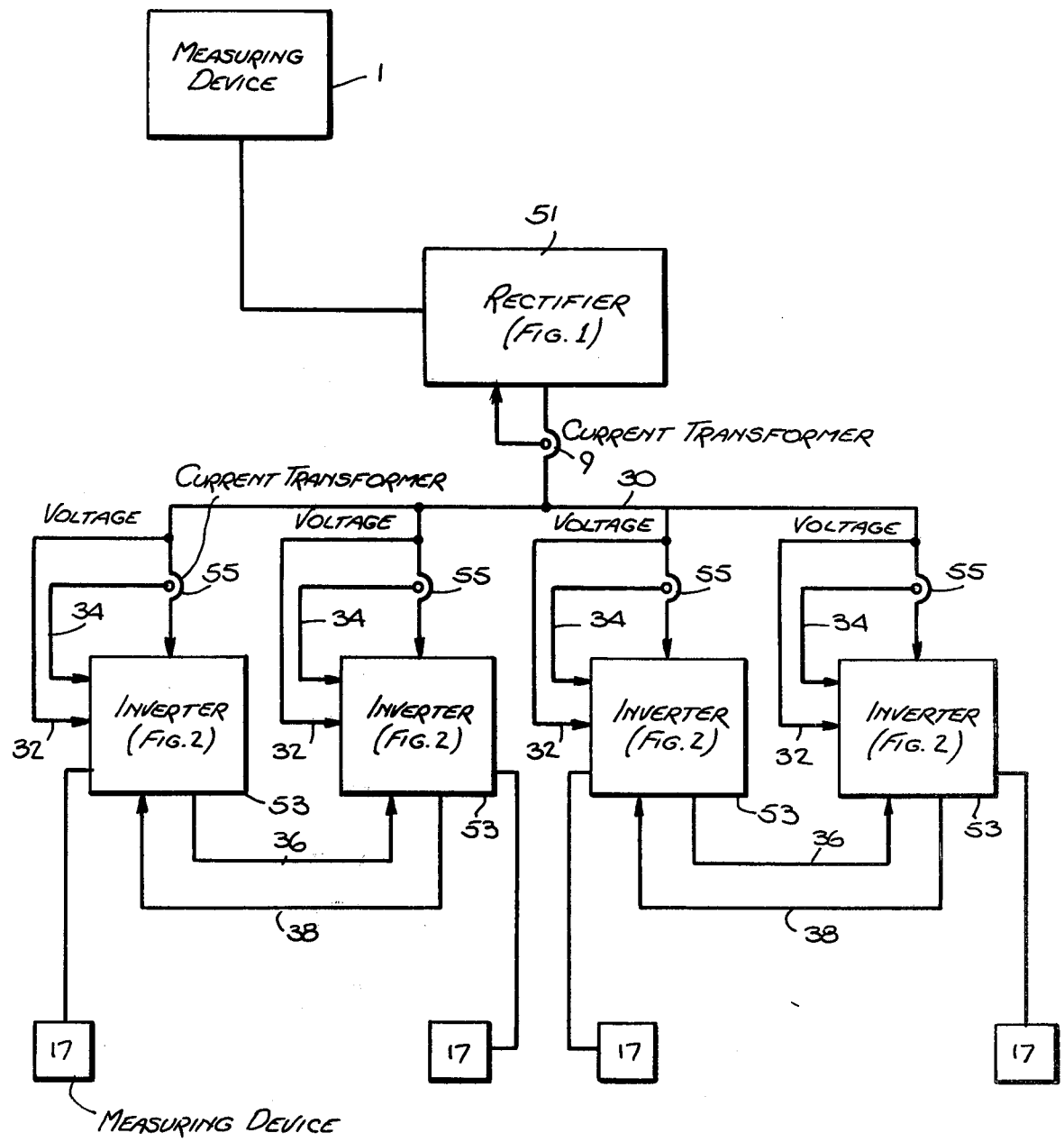
FIG. 3 is a block diagram illustrating the interconnection of the unit of FIG. 1 with a number of units according to FIG. 2.

FIG. 3 is a block diagram illustrating the manner in which the rectifier of FIG. 1 is interconnected with a plurality of inverters according to FIG. 2. Shown on FIG. 3 is a rectifier 51 receiving an input from the measuring device 1. The rectifier 51 includes all of the elements shown on FIG. 1 except for the measuring device 1 and the current transformer 9 which are again shown on FIG. 3. The network voltage from the rectifier is thus provided on the network or line 30. Line 30 is coupled to a plurality of inverters 53 according to FIG. 2. Again, the inverters 53 include all of the elements of FIG. 2 except for the measuring device 17 which is again illustrated. In addition to the input from the measuring device 17, each inverter 53 has as an input on a line 32 the network voltage being supplied to that inverter and has an input on a line 34 the current being supplied to that inverter as measured by a transformer 55. The interconnections between inverter units, so that one may use power not being used by another, which is accomplished by means of the lines 36 and 38, is also shown.

As already mentioned, the computer circuit 2 provided in the rectifier station operates with a fixed, predetermined current-voltage characteristic. A voltage corresponding to the available power is, therefore, always set in the DC network via the voltage controller 6 of the rectifier 5. The predetermined voltage-current characteristic for the computer circuit 11 in the inverter station is, on the other hand, matched to the current-voltage characteristic of the computer circuit 2 and to the output capacity of the rectifier station. Due to the fixed current-voltage characteristic of the computer circuit 2, the voltage in the DC network is a measure of the power available in the rectifier station at any one time. As a result, the output capacity of the rectifier station can always be determined by a simple voltage measurement in the DC network, and the respective maximum value for the reference input in the inverter station in question can be determined by the computer circuit 11 of the inverter station solely on the basis of the fixed, predetermined voltage-current characteristic. A definite amount of power corresponding to a portion of the respective output capacity of the rectifier station is, therefore, ensured for each inverter station. This definite power can be consumed by the inverter station in question with certainty regardless of the instantaneous power demand of other inverter stations.

What is claimed is:

1. A method for the transmission of DC current via a DC network between at least one rectifier station and several inverter stations comprising the steps of:

forming a reference input for the voltage controller of the rectifier of the rectifier station by means of a computing means on the basis of a fixed, predetermined current-voltage characteristic as a function of the maximum possible current in the rectifier station, whereby said rectifier station is voltage-controlled;

forming a maximum value for reference input for the current controller of each inverter station by means of computing means on the basis of a fixed, predetermined voltage-current characteristic which is matched to said current-voltage characteristic and the output capacity of said rectifier station as a function of the voltage of the DC network; and releasing for control of each current controller via a minimum selection circuit connected in series with that current controller the smaller of the maximum value of the reference input for that current controller and a value for the reference input corresponding to the power demand associated with the inverter station which includes that current controller, whereby each said inverter station is current controlled.

2. A method in accordance with claim 1 in which:

in said step of forming said reference inputs for said voltage controller account is taken for the voltage drop between the rectifier station which includes said voltage controller and a fictitious point in said DC network; and in said step of forming a reference input for each current controller account is taken for the voltage drop between the inverter station which includes that current controller and said fictitious point.

3. A method according to claim 1 which further includes the steps of:

taking the difference between the maximum value of the reference input of each current controller and a quantity proportional to the current in the inverter station which includes that current controller to form a difference value corresponding to each current controller;

adding the difference value corresponding to each current controller, when positive, to the maximum value of the reference input of another current controller.

* * * * *